(12) United States Patent
Ogaki et al.

(10) Patent No.: US 9,911,070 B2
(45) Date of Patent: Mar. 6, 2018

(54) IMPROVING PRODUCT PACKING OPERATION EFFICIENCY

(71) Applicant: CANON KABUSHIKI KAISHA, Tokyo (JP)

(72) Inventors: Tetsuro Ogaki, Yokohama (JP); Kimio Hayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/413,782

(22) Filed: Jan. 24, 2017

(65) Prior Publication Data

US 2017/0220908 A1 Aug. 3, 2017

(30) Foreign Application Priority Data

Jan. 29, 2016 (JP) .................................. 2016-016370

(51) Int. Cl.
*G06F 15/00* (2006.01)
*G06F 3/12* (2006.01)
*G06K 1/00* (2006.01)
*G06K 15/02* (2006.01)
*G06K 15/00* (2006.01)

(52) U.S. Cl.
CPC ....... *G06K 15/024* (2013.01); *G06K 15/1856* (2013.01); *G06K 15/404* (2013.01)

(58) Field of Classification Search
CPC . G06K 15/024; G06K 15/1856; G06K 15/404

USPC ............................... 358/1.15, 1.1, 1.14, 1.13
See application file for complete search history.

(56) References Cited

U.S. PATENT DOCUMENTS

2012/0279409 A1* 11/2012 Aylward .................... B41J 3/01
101/483
2014/0360141 A1* 12/2014 Willard, III ........ G06Q 30/0635
53/507

FOREIGN PATENT DOCUMENTS

JP 11-079327 A 3/1999

* cited by examiner

*Primary Examiner* — Douglas Tran
(74) *Attorney, Agent, or Firm* — Canon U.S.A., Inc. IP Division

(57) ABSTRACT

An information processing apparatus prints, when a first product is read by a reading apparatus, a first work instruction sheet including information about all products to be delivered to a first destination of the read first product, prints, if all products to be delivered to the first destination are read by the reading apparatus, a first shipping label for delivery to the first destination, determines, if a second product to be delivered to a second destination different from the first destination is read by the reading apparatus, whether any other product is to be delivered to the second destination, and prints, if it is determined that there no other product is to be delivered to the second destination, a second shipping label for delivery to the second destination.

7 Claims, 10 Drawing Sheets

FIG. 9

| WORK INSTRUCTION SHEET ||
|---|---|
| PRODUCT IMAGE | PRODUCT TYPE |
| ABC ~902 | MANUAL A ~904 |
| DEF ~903 | MANUAL B ~905 |
| | |
| | |
| | |

901

IMPROVING PRODUCT PACKING OPERATION EFFICIENCY

BACKGROUND

Field

The present disclosure relates to an information processing apparatus for improving efficiency in a product packing operation.

Description of the Related Art

The increase in processing speed and improvement in image quality of electrophotographic printing apparatuses and inkjet printing apparatuses have led to increasing popularity of on-demand printing among manufacturers. Various final products including handouts, such as flyers, brochures, manuals, and tickets for various events are printed on demand by the manufacturers. To identify a destination of a final product, a work instruction sheet that associates product information with destination information is also printed at the time of printing parts (printed sheets) for the final product, and the work instruction sheet is attached to the printed sheets and managed. This, however, creates extra work to remove the work instruction sheet attached to the printed sheets before execution of finishing processing, such as cutting and bookbinding on the printed sheets in order to prevent the work instruction sheet from undergoing the finishing processing together with the printed sheets during the execution of the finishing processing on the printed sheets.

Japanese Patent Application Laid-Open No. 11-079327 discusses a technique that when a worker packs goods to be delivered to the same destination in a box, the worker picks up goods, reads barcodes of the picked up goods with an inspection terminal, and outputs for each packed box a specification of the packed goods.

The technique discussed in Japanese Patent Application Laid-Open No. 11-079327 is effective for printing the specification of the goods packed in a box. However, when a worker picks up the goods, the worker needs to look at a pre-printed or pre-displayed pickup list to pick up the goods.

Thus, in a case of shipping a plurality of goods (products) to the same destination, a packing worker needs to correctly pick up the plurality of goods to be delivered to the same destination, and if a wrong one is picked up, the pickup operation turns out to be fruitless.

SUMMARY

According to an aspect of an embodiment, an information processing apparatus includes at one processor and a computer-readable storage medium that stores computer executable instructions, which when executed by the at least one processor, causes printing a first work instruction including information about a product to be delivered to a destination that is the same as a destination of a first product read by a reading apparatus, printing, in a case where all products to be delivered to the destination that is the same as the destination of the first product are read by the reading apparatus, a shipping label for delivery to the destination of the first product, determining, in a case where a second product to be delivered to a destination different from the destination of the first product is read by the reading apparatus, whether there is another product to be delivered to the destination of the second product, and printing, in a case where it is determined that no other product is to be delivered to the destination of the second product, a shipping label for delivery to the destination of the second product.

Further features will become apparent from the following description of exemplary embodiments with reference to the attached drawings.

BRIEF DESCRIPTION OF THE DRAWINGS

FIG. 9 is a diagram illustrating an example of a work instruction.

DESCRIPTION OF THE EMBODIMENTS

Figure 1:
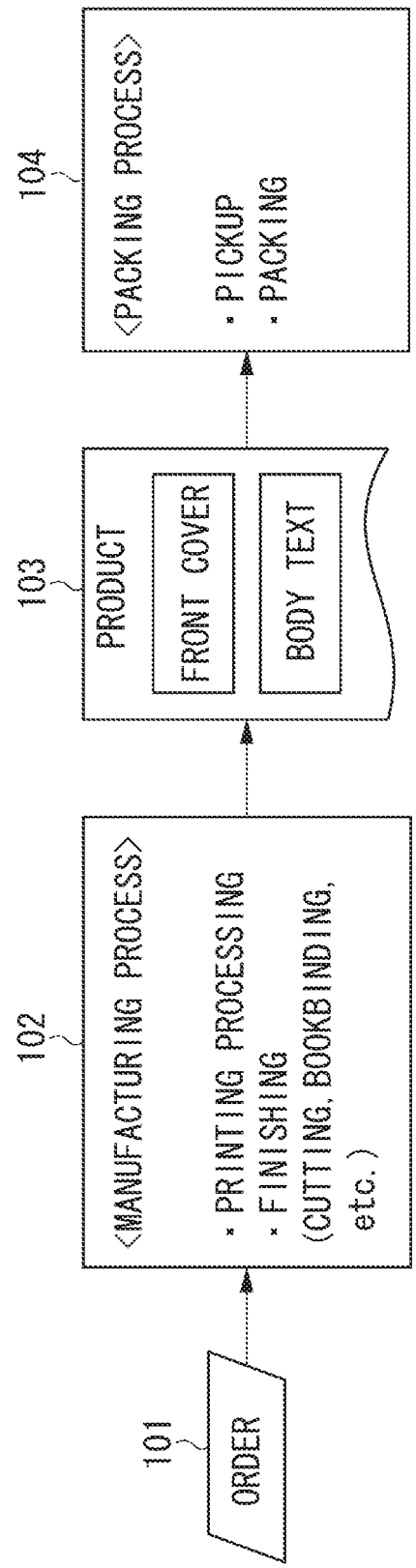
FIG. 1 is a block diagram illustrating a process of on-demand printing.

FIG. 1 is a block diagram illustrating a common process of on-demand printing. When an order 101 is received, an image forming apparatus and a finishing apparatus execute printing processing and finishing processing, e.g., cutting, bookbinding, based on the order 101 in a manufacturing process 102 to manufacture a product (final product) 103. The product 103, e.g., manual book, is manufactured by executing the finishing processing on a plurality of parts, such as a front cover and printed sheets of a body text. The manufactured product is sent to a packing process 104. In the packing process 104, a worker picks up products, packs one product or a plurality of products for each destination, and performs a shipping operation. As described below, in an exemplary embodiment, efficiency of the packing operation in the packing process 104 is improved using an information processing apparatus and a reading apparatus.

In general, the order 101 is received together with contents data of the parts, e.g., front cover, printed sheets of body text, described in a format, such as Portable Document Format (PDF).

Figure 2:
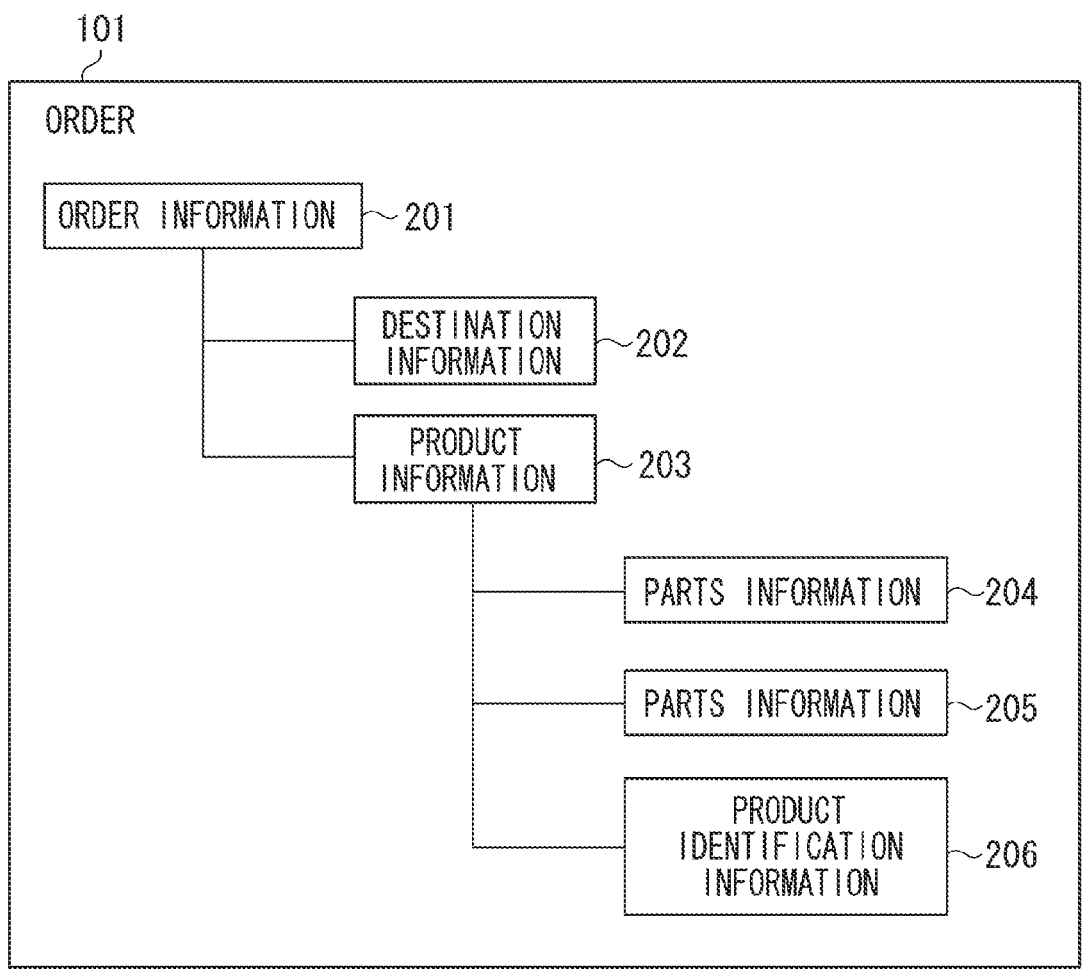
FIG. 2 is a block diagram illustrating an example of order information.

FIG. 2 illustrates an example of order information 201. In FIG. 2, the order information 201 refers to information included in the order 101, and destination information 202 and product information 203 are included in the order information 201. The product information 203 includes parts information 204, parts information 205, and product identification information 206. The parts information 204 and the parts information 205 are information about the parts of the product 103. The product identification information 206 is information for identifying the product 103. Examples of information that can be used as the product identification information 206 include a product identifier (ID), e.g., ID such as a character string, barcode, or matrix code, and product feature information (product image information). The product identification information 206 can be any form of information that can associate the product 103 with the product information 203 on a one-on-one basis. In the present exemplary embodiment, image feature information indicating a final appearance of the product is included as the product identification information 206. The parts information 204 and the parts information 205 contain contents data (PDF data) of the respective parts.

Figure 3:
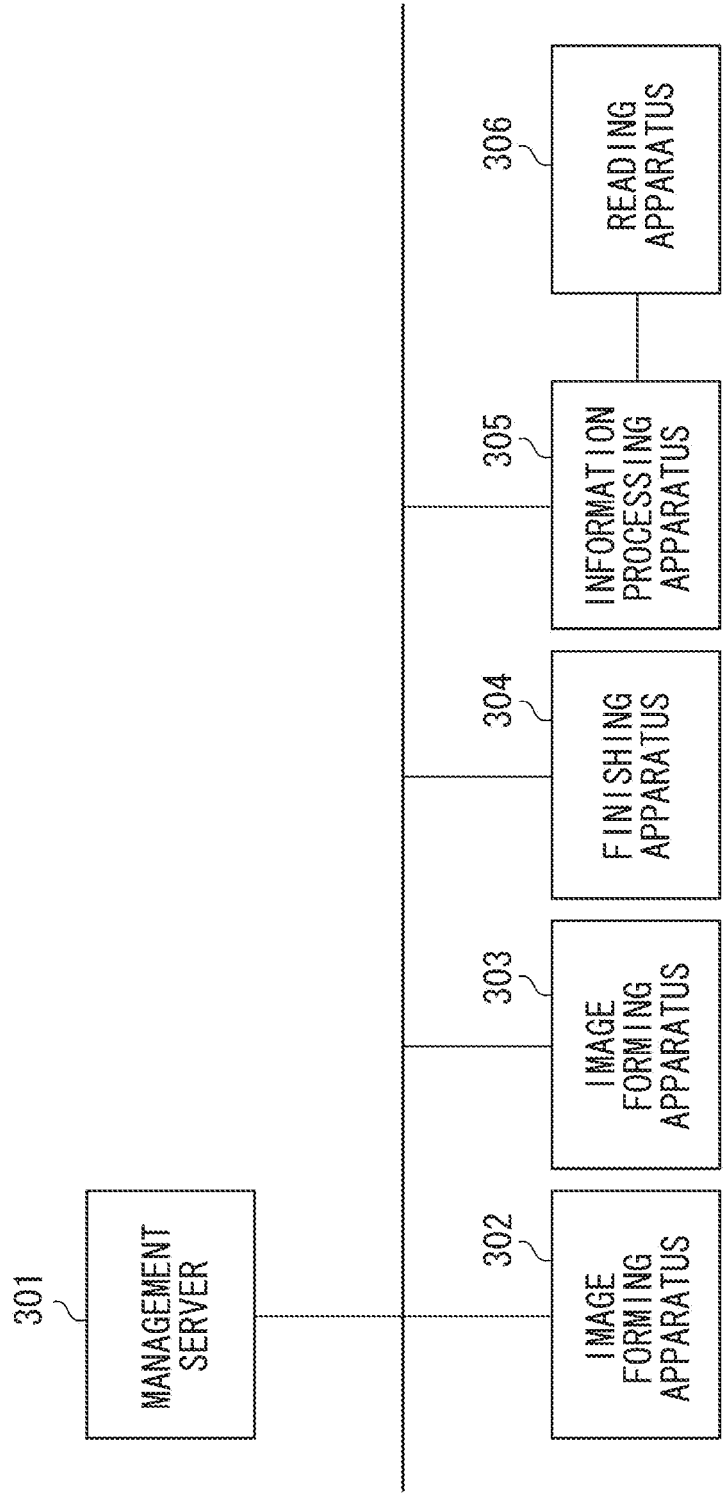
FIG. 3 is a block diagram illustrating an example of a system configuration of an information processing system.

FIG. 3 is a diagram illustrating a system configuration of an information processing system according to the present exemplary embodiment. As illustrated in FIG. 3, the information processing system includes a management server 301, image forming apparatuses 302 and 303, a finishing apparatus 304, an information processing apparatus 305, and a reading apparatus 306. The management server 301, the image forming apparatuses 302 and 303, the finishing apparatus 304, and the information processing apparatus 305 communicate with one another via a network. The information processing apparatus 305 and the reading apparatus 306 communicate with each other.

When the management server 301 receives the order 101, the management server 301 generates, based on the order information 201, a workflow that describes processes for manufacturing a product. The management server 301 manages the image forming apparatus 302 and the finishing apparatus 304.

The image forming apparatus 302 is connected to the management server 301 and executes a printing process, i.e., print job, from among the processes described in the workflow generated by the management server 301 to print parts of the product. The image forming apparatus 303 is connected to the information processing apparatus 305 and prints a work instruction sheet 901 and a shipping label that are transmitted from the information processing apparatus 305. The finishing apparatus 304 is connected to the management server 301 and executes a finishing process, i.e., finishing job, from among the processes described in the workflow generated by the management server 301 to output a finished product.

The information processing apparatus 305 receives the order information 201 from the management server 301 and also receives information read by the reading apparatus 306 from the reading apparatus 306.

Figure 4:
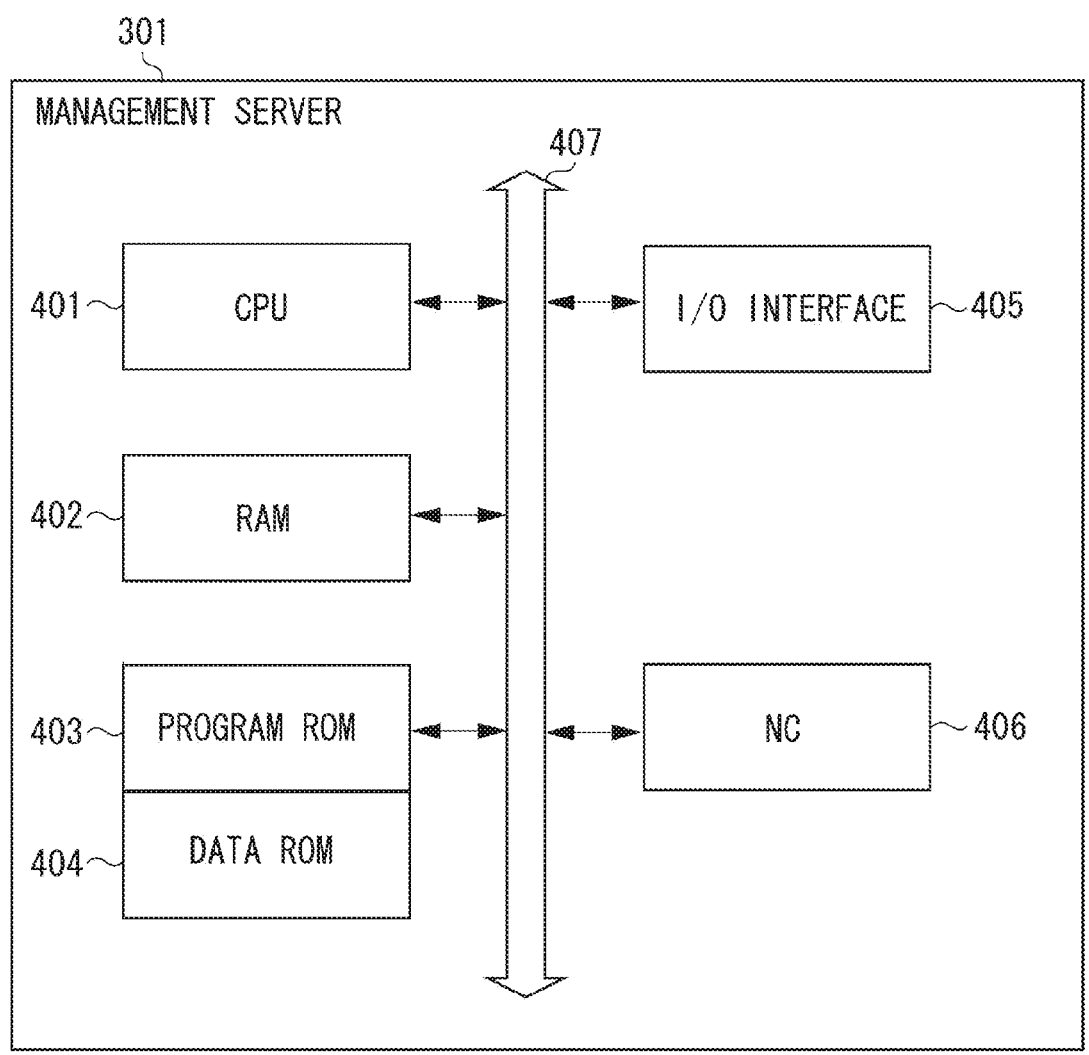
FIG. 4 is a diagram illustrating a hardware configuration of a management server.

FIG. 4 is a block diagram illustrating the hardware configuration of the management server 301. The management server 301 includes a central processing unit (CPU) 401, a random access memory (RAM) 402, a program read-only memory (ROM) 403, a data ROM 404, an input/output (I/O) interface 405, a network controller (NC) 406, and a bus 407. The CPU 401 executes an operation system (OS), a general server, a program, and the like loaded into the program ROM 403 and comprehensively controls devices connected to the bus 407. The RAM 402 functions as a main memory, a work area, and the like of the CPU 401. The program ROM 403 stores an operating system program that is a control program of the CPU 401 and an order management function program for receiving an order and transmitting a job necessary for manufacturing a product. The data ROM 404 stores the received order 101 and the order information 201. The I/O interface 405 controls what is displayed on a display, key input using the display, etc. The NC 406 is connected to the network and executes processing to control communication with other devices connected to the network. The reception of the order 101 and job transmission to the image forming apparatus 302 and the finishing apparatus 304 are performed via the NC 406. The bus 407 is a communication path that is used for communication between the modules.

Figure 5:
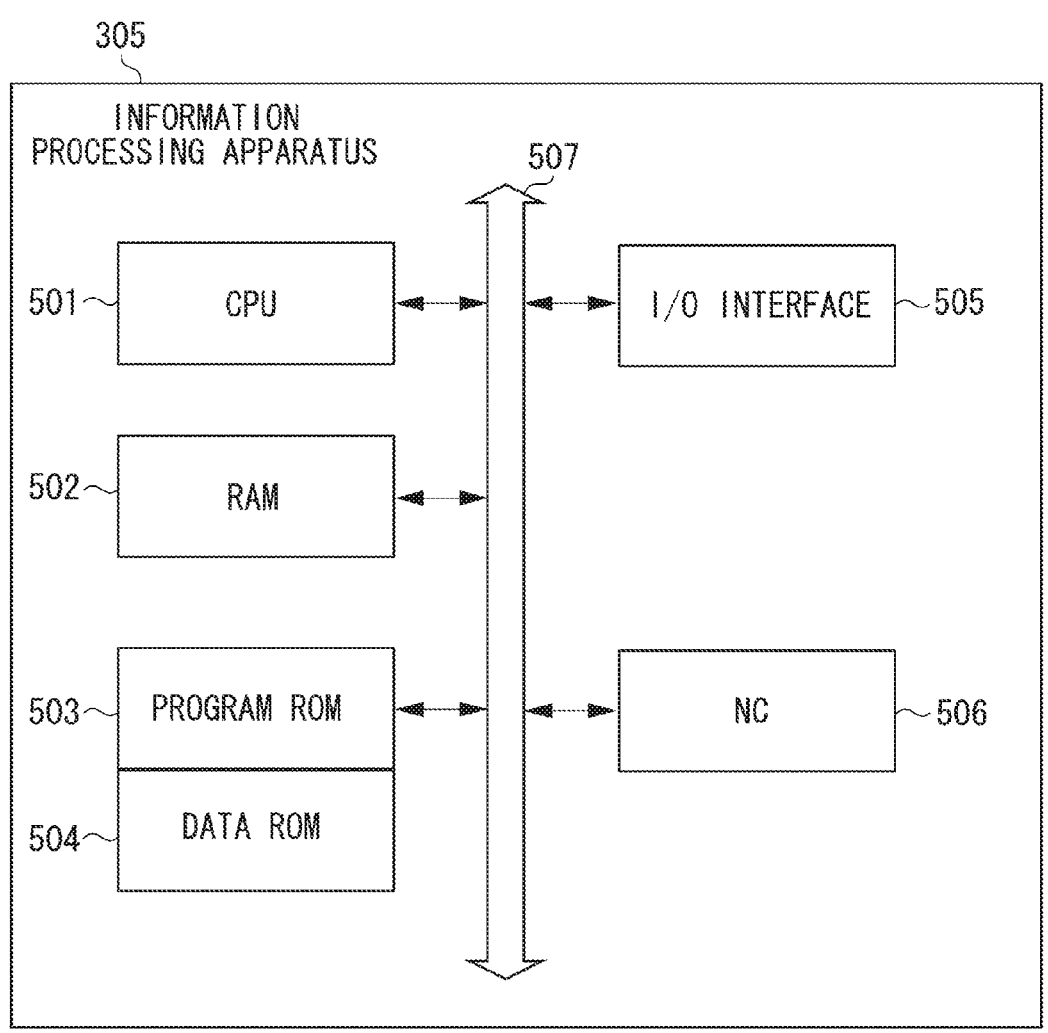
FIG. 5 is a diagram illustrating a hardware configuration of an information processing apparatus.

FIG. 5 is a block diagram illustrating the hardware configuration of the information processing apparatus 305. The information processing apparatus 305 includes a CPU 501, a RAM 502, a program ROM 503, a data ROM 504, an I/O interface 505, a NC 506, and a bus 507. The CPU 501 executes an OS, a general server, a program, and the like loaded into the program ROM 503 and comprehensively controls devices connected to the bus 507. The RAM 502 functions as a main memory, a work area, and the like, of the CPU 501. The program ROM 503 stores an operating system program that is a control program of the CPU 501 and a program that causes a computer to function as a processing unit according to the present exemplary embodiment described below. The data ROM 504 stores the received order information 201. The I/O interface 505 controls what is displayed on a display, key input using the display, and the like, and is used for inputting information read by the reading apparatus 306. The NC 506 is connected to the network and executes processing to control communication with other devices connected to the network. The order information 201 is received via the NC 506. The bus 507 is a communication path used for communication between the modules.

Figure 6:
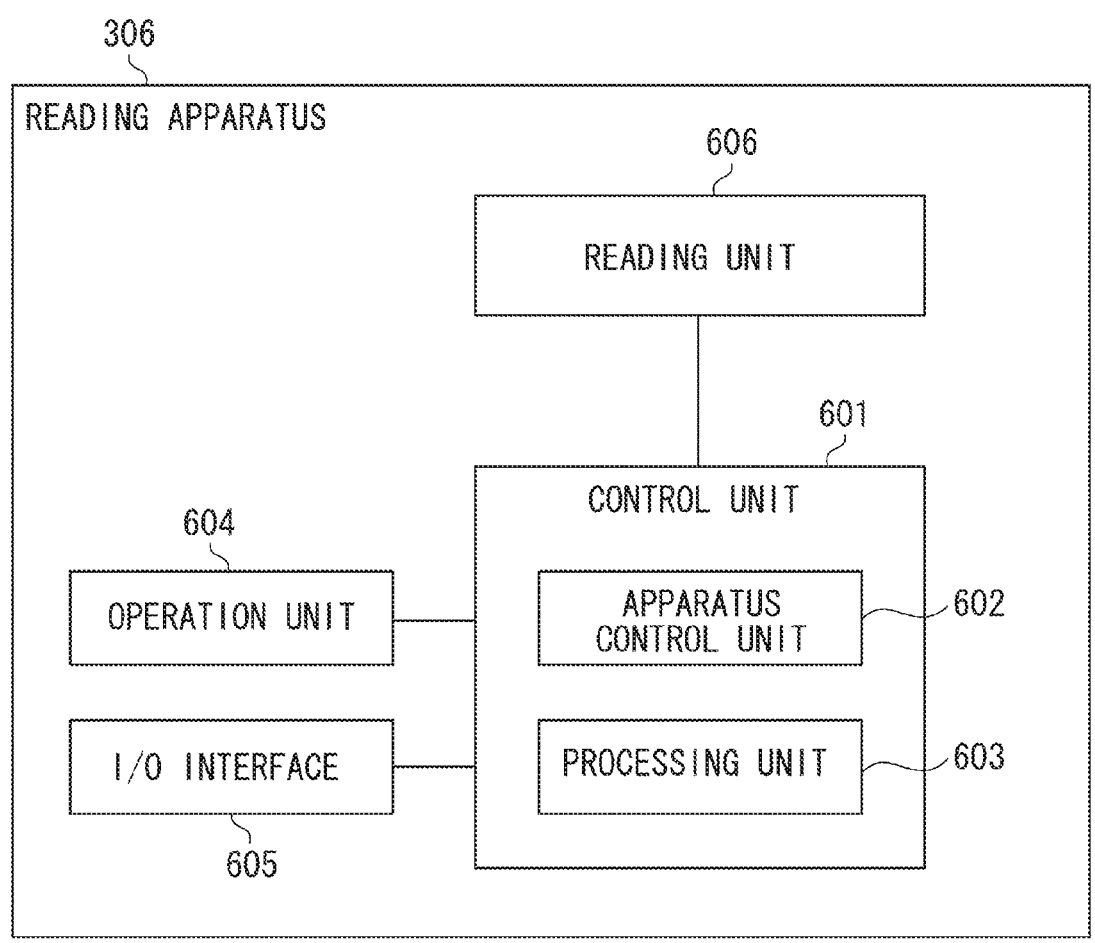
FIG. 6 is a diagram illustrating a hardware configuration of a reading apparatus.

FIG. 6 is a block diagram illustrating the hardware configuration of the reading apparatus 306. The reading apparatus 306 includes an operation unit 604, an I/O interface 605, and a reading unit 606, which are connected to one another via a control unit 601. The control unit 601 includes a processing unit 603 and an apparatus control unit 602. The processing unit 603 processes information (captured image information) read by the reading unit 606 (image capturing unit, such as a camera). The apparatus control unit 602 controls the reading apparatus 306. In the reading apparatus 306, the operation unit 604 is operated to cause the reading unit 606 to operate, and information read by the reading unit 606 is transmitted to an external device connected via the processing unit 603 and the I/O interface 605. The information read by the reading apparatus 306 is information that contains product information, and the product can be identified by comparing the read information with the product identification information 206. In the present exemplary embodiment, the product image information is described as an example of the information to be read.

Figure 7:
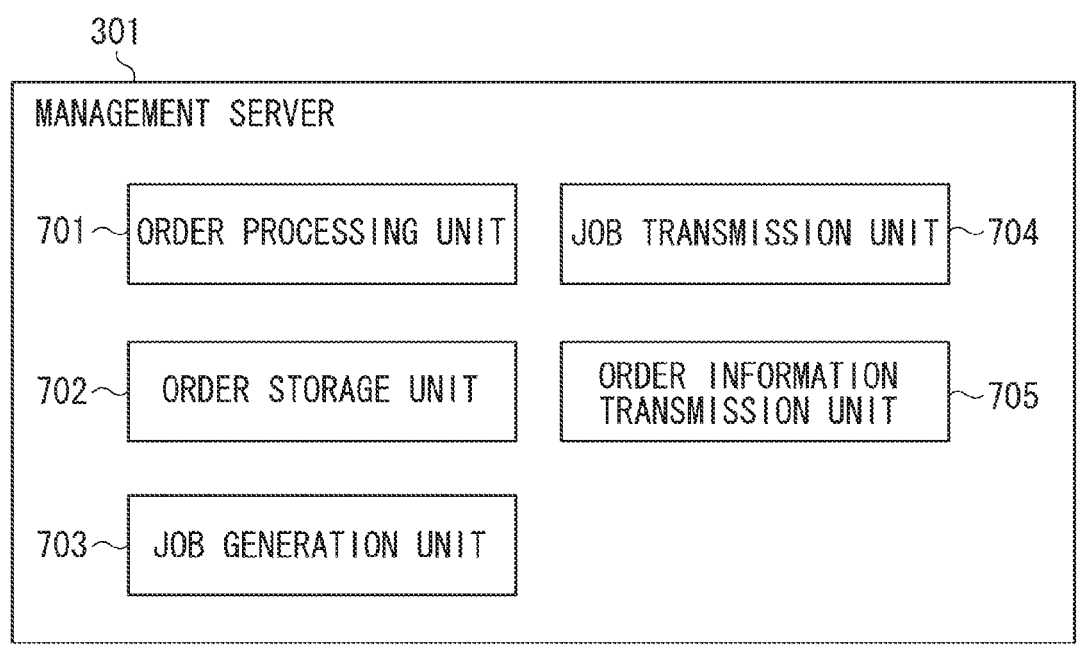
FIG. 7 is a diagram illustrating a software configuration of a management server.

FIG. 7 is a block diagram illustrating the software configuration of the management server 301 according to the present exemplary embodiment. A processor of the management server 301 executes a computer program recorded on a computer-readable recording medium to function as processing units described below. The processing units include an order processing unit 701, an order storage unit 702, a job generation unit 703, a job transmission unit 704, and an order information transmission unit 705. The order processing unit 701 receives an order from a host system and the order storage unit 702 stores order information corresponding to the received order in the data ROM 404. The job generation unit 703 reads the stored order information from the data ROM 404 and generates a job for each part of the product specified in the order. The job is a print job, which is used in the printing process, or a finishing job, which is used in the finishing process, and is generated according to the workflow for manufacturing the product. The management server 301 transmits the print job generated by the job generation unit 703 from the job transmission unit 704 to the image forming apparatus 302 so that the image forming apparatus 302 executes printing. The finishing job generated by the job generation unit 703 is transmitted from the job transmission unit 704 to the finishing apparatus 304 so that the finishing apparatus 304 executes finishing. The order information transmission unit 705 transmits the order information 201 to the information processing apparatus 305 after the job generation unit 703 generates the job.

In the case of the order 101, a print job for the front cover and the body text, which are the parts of a manual, is transmitted to the image forming apparatus 302, and a finishing job for finishing processing, such as bookbinding and cutting is transmitted to the finishing apparatus 304. Finishing processing, e.g., bookbinding, is then performed on the front cover and printed sheets of the body text to produce the manual as a product.

Figure 8:
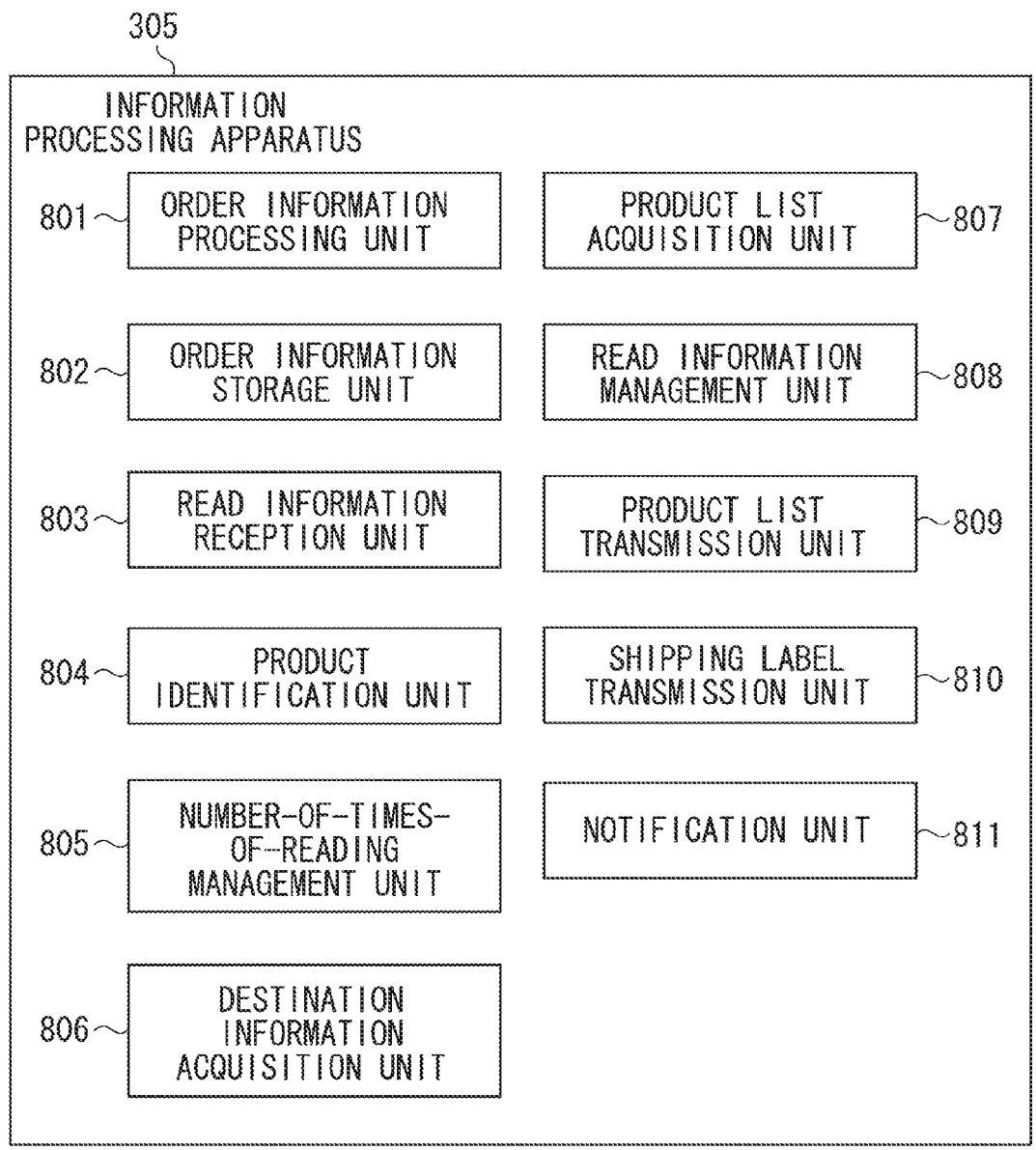
FIG. 8 is a diagram illustrating a software configuration of an information processing apparatus.

FIG. 8 is a diagram illustrating the software configuration of the information processing apparatus 305. A processor of the information processing apparatus 305 executes a computer program recorded on a computer-readable recording medium to function as processing units described below. The processing units include an order information processing unit 801, an order information storage unit 802, a read information reception unit 803, a product identification unit 804, a number-of-times-of-reading management unit 805, a destination information acquisition unit 806, a product list acquisition unit 807, a read information management unit 808, a product list transmission unit 809, a shipping label transmission unit 810, and a notification unit 811.

The order information processing unit 801 receives the order information 201 transmitted from the order information transmission unit 705 of the management server 301, and the order information storage unit 802 stores the received order information 201 in the data ROM 504. The read information reception unit 803 receives the information read by the reading apparatus 306. The product identification unit 804 identifies the read product based on the read information about the product received by the read information reception unit 803 and the stored order information 201.

In the present exemplary embodiment, image information about a captured image of the product is received from the reading apparatus 306, and a product image including the highest similarity from among stored product images is selected to thereby identify the read product. The number-of-times-of-reading management unit 805 manages the number of times of reading of a product that is performed by the reading apparatus 306. The number of times of reading managed by the number-of-times-of-reading management unit 805 is determined based on the number of times in which read information is received by the read information reception unit 803. The number of times of reading managed by the number-of-times-of-reading management unit 805 is reset to zero when all products to be delivered to the same destination as the destination of the product read in the first-time reading are packed.

The destination information acquisition unit 806 acquires the destination of the read product from the data ROM 504 based on the information identified by the product identification unit 804. The product list acquisition unit 807 acquires from the data ROM 504 a product to be delivered to the same destination as the destination of the identified product. The read information management unit 808 manages how many of the products to be delivered to the same destination that are acquired by the product list acquisition unit 807 are read.

When the number-of-times-of-reading management unit 805 determines that the number of times of reading is one, i.e., the first-time reading, the product list transmission unit 809 transmits to the image forming apparatus 303 information of a work instruction sheet that includes a list of products to be delivered to the same destination that is acquired by the product list acquisition unit 807, thereby issuing an instruction to print the work instruction sheet. When the read information management unit 808 determines that all products to be delivered to the same destination are read, the shipping label transmission unit 810 transmits information of a shipping label for the destination to the image forming apparatus 303, thereby issuing an instruction to print the shipping label.

In a case where the destination of the product determined by the number-of-times-of-reading management unit 805 as being read in the first-time reading is different from the destination of the product determined by the number-of-times-of-reading management unit 805 as being read in the second or subsequent reading, the notification unit 811 notifies a packing worker that the destinations are different. Examples of a method for the notification include producing a sound or displaying a message indicating that the destinations are different. The notification method is not limited to these methods, and any method that enables a packing worker to be notified can be used.

FIG. 9 is a diagram illustrating an example of the work instruction sheet 901, which is a list of products. The work instruction sheet 901 is output for each destination and specifies a list of products to be delivered to the same destination. In the present exemplary embodiment, product images 902 and 903 and product types 904 and 905 are included to clearly indicate information about the products to be picked up. If there are products to be packed together according to the work instruction sheet, the packing worker performs an operation to pick up a second or subsequent product to be packed.

Figure 10:
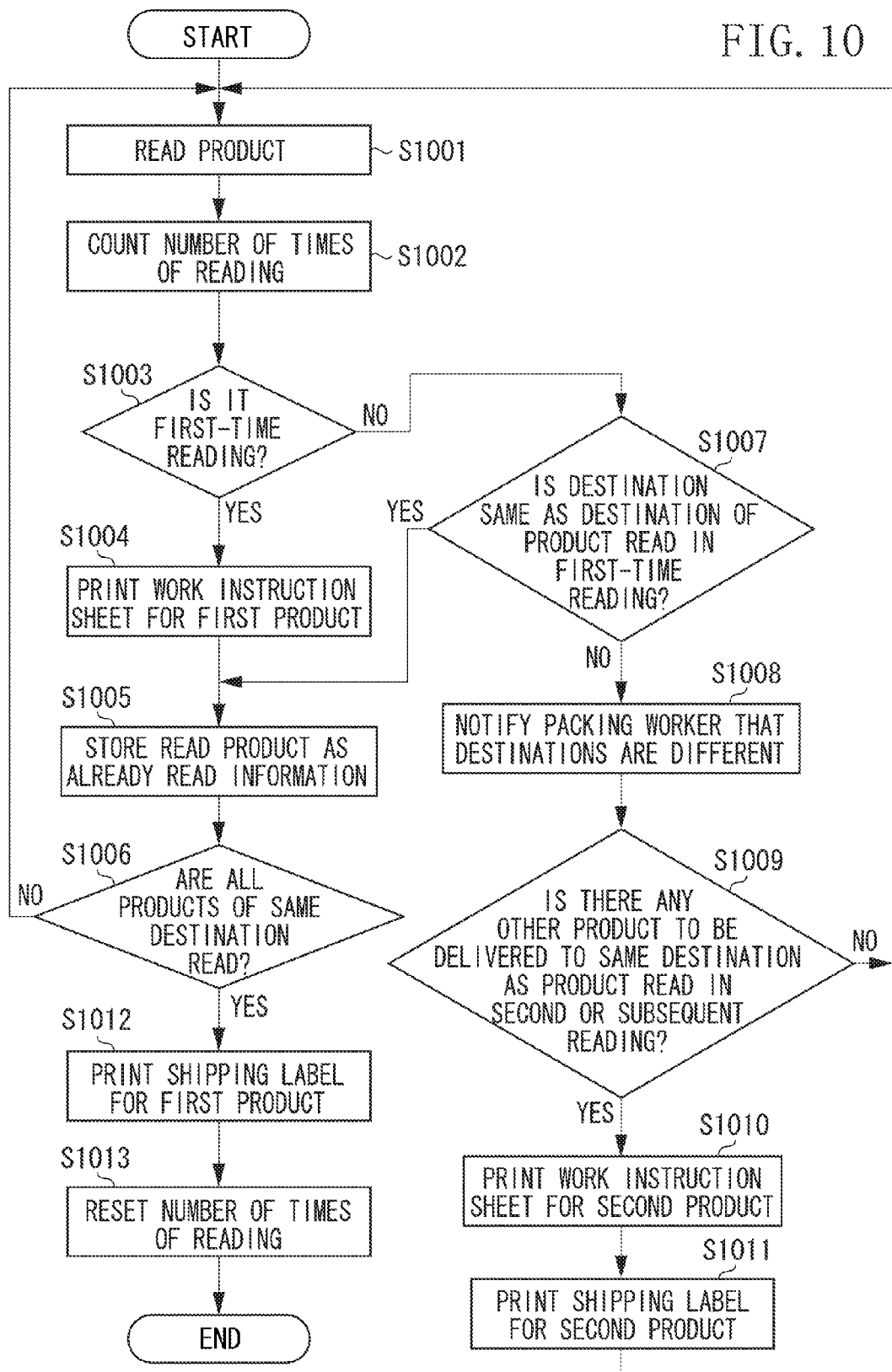
FIG. 10 is a flow chart illustrating a product packing process.

FIG. 10 is a flow chart illustrating a product packing process according to the present exemplary embodiment. In step S1001, a product on which the finishing processing has been performed is read by the reading apparatus 306. What is read in this process is the product identification information 206, and examples of the product identification information 206 include a barcode, a product image, etc. The form of the product identification information 206 is not limited to the above. In the present exemplary embodiment, a product image is read. The read information is transmitted to the information processing apparatus 305.

In step S1002, the number-of-times-of-reading management unit 808 counts the number of times of reading. The counted number of times of reading is used in step S1003. In step S1003, the number-of-times-of-reading management unit 805 determines the number of times of reading. In a case where it is the first-time reading (YES in step S1003), the processing proceeds to step S1004. In a case where it is the second or subsequent reading (NO in step S1003), the processing proceeds to step S1007.

In step S1004, the product list transmission unit 809 of the information processing apparatus 305 transmits information of the work instruction sheet 901, which includes a product list, to the image forming apparatus 303, and the work instruction sheet 901 is printed. The work instruction sheet 901 is printed based on the read product identification information 206 so that, in contrast to a conventional case where a work instruction is printed in advance, the comparison process between the first product, which is read in the first-time reading, and the work instruction sheet 901 is omitted.

In step S1005, the read information management unit 808 stores the read product as already read information. The stored already read information is used in step S1006.

In step S1006, the read information management unit 808 compares the product stored as the already read information in step S1005 with the product list acquired by the product list acquisition unit 807 to determine whether all products to be delivered to the same destination are read. In a case where the read information management unit 808 determines that all products to be delivered to the same destination are read (YES in step S1006), the processing proceeds to step S1012. In a case where the read information management unit 808 determines that not all products to be delivered to the same destination are read (NO in step S1006), the processing proceeds to step S1001.

In step S1007, the product identification unit 804 identifies the product read in the second or subsequent reading, and the destination information acquisition unit 806 acquires the destination of the identified product. The read information management unit 808 determines whether the acquired destination is the same as the destination of the product read in the first-time reading. In a case where the acquired destination is the same as the destination of the product read in the first-time reading (YES in step S1007), the processing proceeds to step S1005. In a case where the acquired destination is different from the destination of the product read in the first-time reading (NO in step S1007), the processing proceeds to step S1008.

In step S1008, if the destination of the product read in the second or subsequent reading is different from the destination of the product read in the first-time reading, the notification unit 811 notifies a packing worker that the destinations are different. The notification enables the packing worker to be informed that the destination of the product (second product) picked up by the packing worker is different from the destination of the first product.

In step S1009, whether there is another product to be delivered to the same destination as the destination of the product (second product) read in the second or subsequent reading is checked. In a case where there is no other product to be delivered to the same destination as the destination of the second product (YES in step S1009), the processing proceeds to step S1010. In a case where there is another product to be delivered to the same destination as the destination of the second product (NO in step S1009), the processing proceeds to step S1001.

In step S1010, the product list transmission unit 809 transmits information of a work instruction sheet 901 corresponding to the read second product to the image forming apparatus 303, and the work instruction sheet 901 for the second product is printed. When the printing of the work instruction sheet 901 for the second product is ended, the processing proceeds to step S1011.

In step S1011, the shipping label transmission unit 810 transmits information of a shipping label corresponding to the destination of the read second product to the image forming apparatus 303, and the shipping label for the second product is printed. When the printing of the shipping label ends, the shipping label is attached to a box in which the second product is packed, and the processing ends. When the processing on the second product ends, the processing proceeds to step S1001 to return to the processing on the product read in the first-time reading. In this way, even when the second product to be delivered to the destination which is different from the destination of the first product is read, if there is no other product to be delivered at the same time to the destination of the second product, the shipping label for the second product is printed and the second product can be transferred to a delivery process, whereby the operations are efficiently performed.

In step S1012, when all products to be delivered to the same destination are read, the shipping label transmission unit 810 transmits information of a shipping label to the image forming apparatus 303, and the shipping label is printed by the image forming apparatus 303. Since the shipping label is printed when all products to be delivered to the same destination are read, this can be a signal indicating that the packing of the products to be delivered to the same destination ends, and printing of a plurality of shipping labels for the same destination is prevented.

In step S1013, the number-of-times-of-reading management unit 805 resets the counted number of times of reading to zero.

The foregoing arrangement improves efficiency in the product packing operation in the present exemplary embodiment.

OTHER EMBODIMENTS

Embodiments can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment and/or that includes one or more circuits (e.g., application specific integrated circuit (ASIC)) for performing the functions of one or more of the above-described embodiment, and by a method performed by the computer of the system or apparatus by, for example, reading out and executing the computer executable instructions from the storage medium to perform the functions of one or more of the above-described embodiment and/or controlling the one or more circuits to perform the functions of one or more of the above-described embodiment. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-016370, filed Jan. 29, 2016, which is hereby incorporated by reference herein in its entirety.

What is claimed is:

1. An information processing apparatus comprising:
   at least one processor;
   a computer-readable storage medium that stores computer executable instructions, which when executed by the at least one processor, causes:
   printing a first work instruction sheet including information about a product to be delivered to a destination that is the same as a destination of a first product read by a reading apparatus;
   printing, in a case where all products to be delivered to the destination that is the same as the destination of the first product are read by the reading apparatus, a first shipping label for delivery to the destination of the first product;

determining, in a case where a second product to be delivered to a destination different from the destination of the first product is read by the reading apparatus, whether there is another product to be delivered to the destination of the second product; and printing, in a case where it is determined that no other product is to be delivered to the destination of the second product, a second shipping label for delivery to the destination of the second product.

2. The information processing apparatus according to claim 1, further comprising issuing, in the case where the second product to be delivered to the destination different from the destination of the first product is read by the reading apparatus, a notification that the destination is different.

3. The information processing apparatus according to claim 1, wherein, in the case where it is determined that no other product is to be delivered to the destination of the second product, a second work instruction sheet including information about the second product and the second shipping label for delivery to the destination of the second product are printed.

4. An information processing method comprising:

printing a first work instruction sheet including information about a product to be delivered to a destination that is the same as a destination of a first product read by a reading apparatus;

printing, in a case where all products to be delivered to the destination that is the same as the destination of the first product are read by the reading apparatus, a first shipping label for delivery to the destination of the first product;

determining, in a case where a second product to be delivered to a destination different from the destination of the first product is read by the reading apparatus, whether there is another product to be delivered to the destination of the second product; and printing, in a case where it is determined that no other product is to be delivered to the destination of the second product, a second shipping label for delivery to the destination of the second product.

5. The information processing method according to claim 4, further comprising issuing, in the case where the second product to be delivered to the destination different from the destination of the first product is read by the reading apparatus, a notification that the destination is different.

6. The information processing method according to claim 4, wherein in the case where it is determined that no other product is to be delivered to the destination of the second product, a second work instruction sheet including information about the second product and the second shipping label for delivery to the destination of the second product are printed.

7. A non-transitory computer-readable storage medium storing instructions that, when executed by a processor, cause the processor to perform operations comprising:

printing a first work instruction sheet including information about a product to be delivered to a destination that is the same as a destination of a first product read by a reading apparatus;

printing, in a case where all products to be delivered to the destination that is the same as the destination of the first product are read by the reading apparatus, a first shipping label for delivery to the destination of the first product;

determining, in a case where a second product to be delivered to a destination different from the destination of the first product is read by the reading apparatus, whether there is another product to be delivered to the destination of the second product; and printing, in a case where it is determined that no other product is to be delivered to the destination of the second product, a second shipping label for delivery to the destination of the second product.

* * * * *